United States Patent Office 3,049,743
Patented Aug. 21, 1962

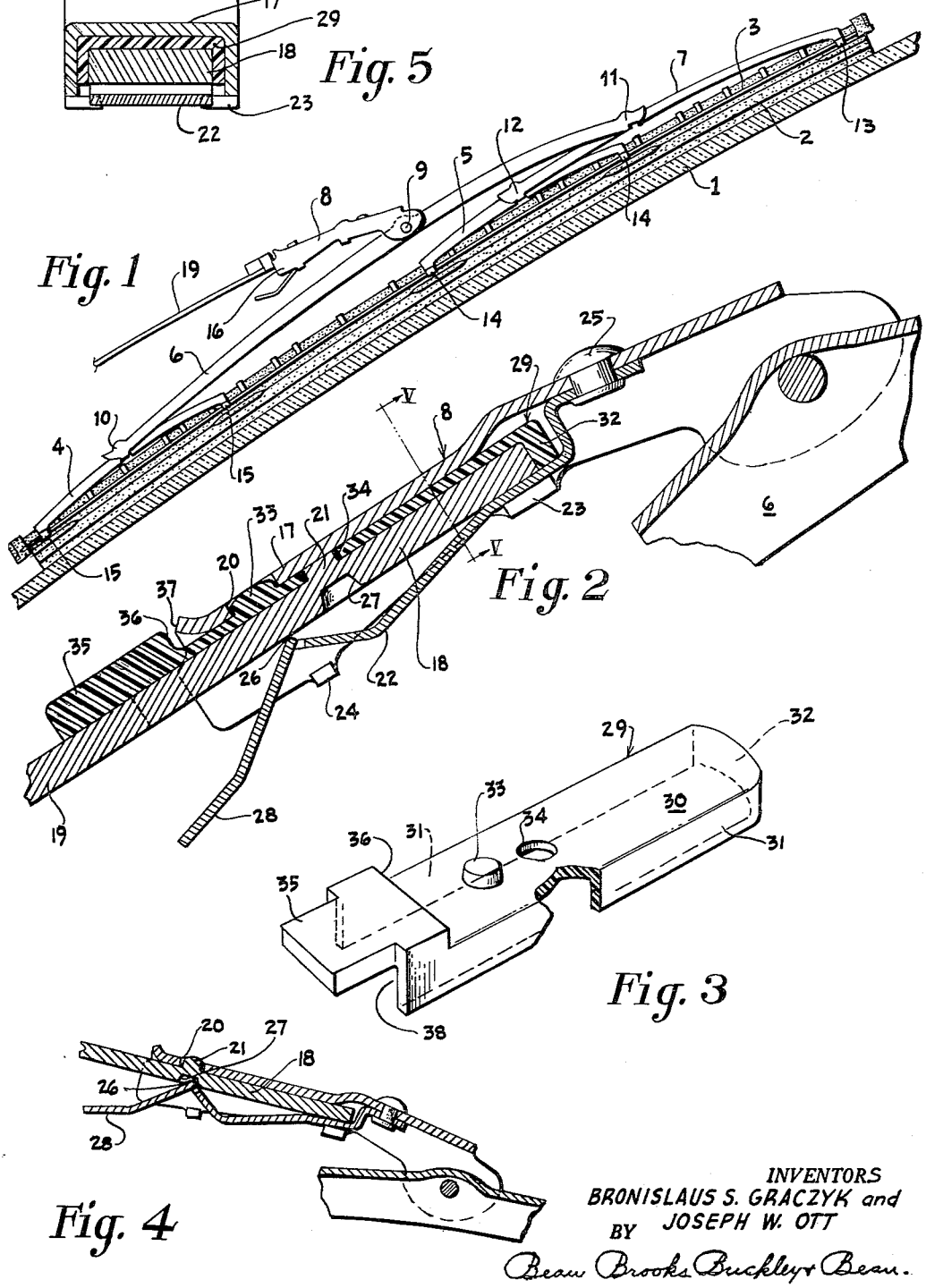

3,049,743
WINDSHIELD CLEANER
Bronislaus S. Graczyk, Snyder, and Joseph W. Ott, Tonawanda, N.Y., assignors to Trico Products Corporation, Buffalo, N.Y.
Filed Oct. 24, 1961, Ser. No. 147,335
9 Claims. (Cl. 15—250.32)

This invention relates to the windshield wiping art and more particularly to the coupling element between the wiper arm and the wiping blade, its purpose being to facilitate the replacement of a worn wiper on its actuating arm with a new wiper.

In copending application Serial No. 813,280 there is illustrated a wiper attaching clip of the type generally being used currently for mounting a wiper on its oscillating arm, the wiper arm having a flat outer terminal designed for detachable engagement with the wiper carried clip. The clip and terminal are provided with interengaging shoulders which are held operatively engaged by means of a flat spring that forms with the clip a chamber or housing for receiving the arm terminal. The width of the arm terminal is substantially equal to that of the internal dimension of the clip chamber to provide a rather snug fit.

More recently, wipers with larger and heavier clips have been supplied the dealers and service stations but the clips have wider and longer dimensions for mounting on the larger arm terminals of the new car installations. When a wiper having a larger clip is used to replace an older wiper having a narrow clip, the wiper connection is loose and subject to lateral play by reason of the clearance within the larger clip chamber about the smaller, narrower arm terminal. To properly effect a replacement there should be a snug fit within the arm-clip coupling in order to obtain a clean wipe across the field of vision.

The purpose of the present invention is to provide means for fitting or equipping the larger clip of a new wiper to receive the narrow terminal of the lighter arms by which the securing interlock may be readily effected.

A further object of the invention is to provide adaptor means for this type of wiper attachment that will serve to center interlocking shoulders within the coupling to effect a double interlock in nested relation between plural sets of shoulders to provide a snug mounting for the new wiper.

The foregoing and other objects will appear as the following description progresses, reference being had to the accompanying drawing wherein:

FIG. 1 is a side elevation of the improved wiper installation upon a section of a curved windshield;

FIG. 2 is an enlarged longitudinal section through the arm-clip of the present invention;

FIG. 3 is a detailed perspective view of the adaptor unit, partly broken away;

FIG. 4 is a view similar to FIG. 2 showing the presently used arm-clip coupling; and FIG. 5 is a cross sectional view taken about on line 5—5 of FIG. 2.

Referring more particularly to the drawing, the numeral 1 shows a section of a curved windshield glass on which is superimposed a wiper having a blade or squeegee 2 backed by a flexible surface-conforming backing strip 3 to which the spring pressure from its actuating arm is applied at longitudinally spaced areas by a superstructure comprising secondary yokes 4 and 5, a primary lever 6 and a secondary lever 7. The improved arm attaching clip 8 is pivotally mounted on the primary lever 6 by a pin 9, the inner end of the primary lever being pivotally supported upon the secondary yoke 4 at 10 and having its opposite end pivotally connected at 11 to the secondary lever 7 with the inner end of the latter being connected at 12 to the secondary yoke 5. The outer end of the secondary lever, and the opposite ends of the yokes 5 and 4 are provided with claws 13, 14 and 15, respectively, which slidably engage the opposite side margins of the flexible backing strip 3.

The wiper attaching clip 8 is of inverted channel shape, the same having spaced side walls 16 joined by a top wall 17 to form a chamber for receiving the terminal 18 of the oscillatory wiper actuating arm 199. The terminal is flat or tongue-shaped and is designed to have a snug fit between the side walls 16. The top wall 17 is formed with an opening to provide a shoulder 20 for interlocking with a shoulder 21 on the arm terminal 18 where it is held by a spring 22 that forms a bottom wall for the chamber. The side walls 16 have fore and aft pairs of inturned tabs or lugs 23 and 24 underlying the bottom-forming spring 22, the fore tabs 23 serving to hold the spring under tension adjacent its anchorage 25 while the aft tabs 24 serve as stops to limit the spring movement. The outer end of the spring 22 is cut and shaped with a bend to provide a catch 26 for engaging a shoulder 27 on the underside of the arm terminal to hold the clip thereon. This shoulder 27 may be formed when pressing the shoulder 21 from the upper side of the terminal. The free outer end of the spring is offset to form a handle portion 28 by which the spring catch may be disengaged to permit removal of the wiping blade unit from its arm 19.

To mount the wiper, the arm terminal is inserted lengthwise into the clip chamber of a new wiper until the arm shoulder 21 drops behind the clip shoulder 20 under the urge of the spring 22. Where the clip chamber is of greater dimension, and especially as to width, there will be clearance about the arm terminal within the clip chamber substantially to the extent indicated by the plastic cross section shown in FIGS. 2 and 5. It will therefore be appreciated that with such clearance there will be sidewise as well as lengthwise slippage of the wiper and its clip on the arm terminal as the oscillating arm strokes the wiper back and forth on the windshield. This slippage may offset the wiper on the arm and may also upset the securing interlock of the coupling. Accordingly, the present invention aims to provide means for insuring snug fit in the mounting of the larger clip embodiment on the smaller arm terminal, and to this end the larger clip is fitted with an adaptor 29 that is designed to be interlockingly inserted within the larger clip and formed with a chamber to fit the smaller terminal. When equipped with the adaptor, one can readily replace a worn wiper on a narrow arm terminal with a new wiper by simply inserting the adaptor in its larger clip chamber and then telescoping the lined clip unit over the arm terminal. Thus, the coupling is made secure and free of any lateral play, and the interlocking action is facilitated and insured by the guidance and alining function of the adaptor to bring the shoulders into accurate interlocking relation.

The adaptor 29, shown in perspective in FIG. 3, is preferably molded from plastic, such as celcon, to conformably fit the arm terminal as well as the interior of the clip chamber. The chambered adaptor has a top wall 30 and opposing side walls 31 designed to lie in contact with the corresponding top wall 17 and side walls 16 of the larger clip body. The side walls 31 are joined by an end wall 32 that is slightly rounded to conform to the contour of the arm terminal. These walls are relatively shallow and substantially equal the thickness of the terminal. The adaptor is molded with a shoulder 33 for interlocking with the clip shoulder 20, and also with a second shoulder 34 for interlocking with the shoulder 21 on the arm terminal. This double interlock, as effected through the pairs of interengaged shoulders 20 and 33 and 21 and 34, serves to hold the wiper firmly on the narrow terminal. Should the shoulders be improperly interengaged, accidental displacement of the wiper from its actuating arm is guarded against by the spring catch 26 that is located in line with the shoulder 27 to engage and thereby prevent total loss of the blade unit.

To facilitate its placement and removal, the adaptor is provided with a finger hold 35 to serve as a handle in positioning the same within the clip chamber. The finger hold is flat and may lie upon the wiper arm 19 just inwardly from the clip and is given sufficient thickness to form a shoulder 36 to overhang the outwardly rolled edge of the opening into the chamber, as indicated at 37, to prevent a cleaning cloth from catching in the same, as when the service station attendant is cleaning the windshield. The side walls 31, which are connected at their outer end by the curved front wall 32, are unconnected at their rear ends to define an entranceway or opening 38 through which the arm terminal is inserted into the lined clip chamber. The plastic adaptor provides a rather tough liner for the clip to hold the arm terminal firmly against relative movement within the clip chamber by reason of the nested assembly which latter permits a wiper replacement being readily accomplished and without the necessity of a service station carrying a full complement of wipers in both sizes of clips.

The foregoing description has been given in detail for clarity and not by way of limitation since the inventive principles involved are capable of assuming other physical embodiments without departing from the spirit of the invention or the scope of the appended claims.

What is claimed is:

1. A windshield cleaner having an oscillating arm with a substantially flat terminal, a wiper having a terminal-receiving clip with an oversize open-bottom chamber, an adaptor liner for the clip snugly nested in the clip chamber and itself having an open-bottom chamber snugly receiving the arm terminal, said terminal and clip chamber being interlocked by spaced pairs of shoulders with the liner to maintain the snug fits during wiper oscillation, and means acting through the open bottoms to hold the shoulders interlocked, one shoulder of one pair being selectively interlockable with a shoulder of the other pair to anchor the clip directly to the arm in the absence of the liner.

2. A windshield cleaner having an oscillating arm with a substantially flat terminal, a wiper having a pivotally mounted terminal-receiving clip with an oversize open-bottom chamber, a liner for the clip snugly nested in the clip chamber and itself having an open-bottom chamber snugly receiving the arm terminal, said terminal and clip chamber being interlocked with the liner to maintain the snug fits during wiper oscillation, and spring means acting on the terminal through the open-bottom of the liner chamber to secure the double interlock.

3. A windshield cleaner having an oscillating arm with a substantially flat terminal, a wiper having a terminal-receiving clip with an open-bottom chamber, a liner for the clip snugly interposed between the clip chamber and the terminal and having an open-bottom chamber receiving the arm terminal, said terminal and clip chamber being interlocked with the liner to maintain the snug fit during wiper oscillation, and spring means acting on the terminal through the open-bottom of the liner chamber to secure the double interlock and to close the open-bottom of the clip chamber and that of the nested liner chamber for resiliently maintaining the double interlock.

4. A windshield cleaner according to claim 3, wherein the spring means has a catch coacting with a part on the terminal to preclude total displacement of the wiper from the terminal upon failure of the interlock to function.

5. A windshield cleaner comprising a wiper, an actuating arm having a terminal portion with a shoulder, an attaching clip on the wiper and having an open-ended chamber slidably receiving the arm terminal portion during relative movement lengthwise of the arm, said clip chamber having an internal shoulder, a liner in the clip chamber effecting a snug fit therewith and with the terminal portion therein, said liner having a shoulder interlocking with the arm shoulder and a second shoulder interlocking with the shoulder in the clip chamber, and a wiper retaining spring latch carried by the clip and interlockable with a second shoulder on the terminal portion to preclude loss of the wiper from the arm through failure of the interlocked shoulders to function.

6. An attaching clip for securing a wiper to an actuating arm having a terminal portion with a shoulder, said clip having a body of inverted channel-shape for slidably receiving the arm terminal portion, the top wall of the inverted channel body having a shoulder, a liner of inverted channel-shape nested upwardly within the clip body and having a shoulder interlocking with the arm shoulder, said liner having a second shoulder interlocking with the clip shoulder, and resilient means carried by the clip body and yieldably holding the shoulders interlocked.

7. An adaptor for a fitting a windshield wiper clip chamber to receive an arm terminal, said adaptor comprising an elongated chambered body having a top wall and opposing side walls joined at one end to form a continuous wall depending from and about the top wall but unconnected at the other end to provide an entranceway into such clip chamber, said top wall having shoulder means to interlock with a shoulder on such clip chamber and other shoulder means to interlock with such arm terminal when inserted in the chambered body, said other end of the top wall being enlarged to overhang the entranceway into such clip chamber.

8. A windshield cleaner having an oscillating arm with a terminal shoulder, a wiper having a terminal-receiving clip with a shoulder therein interlocking directly with a terminal shoulder to secure the wiper to the arm, a displaceable, plastic liner for the clip snugly nested in the clip chamber and itself snugly receiving the arm terminal for establishing a close fit between the aforesaid parts, said terminal and clip chamber being interlockable respectively with two shoulders on the liner to maintain the snug fits during wiper oscillation, and spring means acting on the terminal through the open-bottom of the liner chamber to secure the double interlock.

9. A windshield cleaner comprising a wiper, an actuating arm having a terminal portion with a shoulder, an attaching clip on the wiper having an open-ended chamber slidably receiving the arm terminal portion, said clip chamber having an internal shoulder, and a liner interposed between the terminal portion and the clip and molded from plastic to have a conforming fit therewith, said arm shoulder being selectively interlockable with the clip shoulder and with a shoulder on the liner, said plastic liner extending out through the open end of the clip chamber and overhanging the same to afford protection therefor.

References Cited in the file of this patent
UNITED STATES PATENTS
2,925,616    Krohm _____ Feb. 23, 1960